(12) United States Patent
Domoto et al.

(10) Patent No.: US 11,787,951 B2
(45) Date of Patent: Oct. 17, 2023

(54) PHOTOCURABLE COMPOSITION FOR THREE-DIMENSIONAL MOLDING, THREE-DIMENSIONAL MOLDED PRODUCT, AND METHOD FOR PRODUCING THREE-DIMENSIONAL MOLDED PRODUCT

(71) Applicant: DENKA COMPANY LIMITED, Tokyo (JP)

(72) Inventors: Takashi Domoto, Tokyo (JP); Yoshitsugu Goto, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 287 days.

(21) Appl. No.: 17/413,446

(22) PCT Filed: Mar. 26, 2020

(86) PCT No.: PCT/JP2020/013668
§ 371 (c)(1),
(2) Date: Jun. 11, 2021

(87) PCT Pub. No.: WO2020/196753
PCT Pub. Date: Oct. 1, 2020

(65) Prior Publication Data
US 2022/0073753 A1 Mar. 10, 2022

(30) Foreign Application Priority Data
Mar. 28, 2019 (JP) ................. 2019-062349

(51) Int. Cl.
| | |
|---|---|
| C08F 2/46 | (2006.01) |
| C08F 2/50 | (2006.01) |
| C08G 61/04 | (2006.01) |
| C09D 4/00 | (2006.01) |
| B33Y 10/00 | (2015.01) |
| B33Y 70/00 | (2020.01) |
| B29C 64/124 | (2017.01) |
| C08F 220/18 | (2006.01) |
| C09D 133/06 | (2006.01) |
| B29K 105/00 | (2006.01) |

(52) U.S. Cl.
CPC ............. *C09D 4/00* (2013.01); *B29C 64/124* (2017.08); *B33Y 10/00* (2014.12); *B33Y 70/00* (2014.12); *C08F 220/1811* (2020.02); *C09D 133/062* (2013.01); *B29K 2105/0002* (2013.01)

(58) Field of Classification Search
CPC .... C09D 133/062; C09D 4/00; B29C 64/124; B29K 2105/0002; C08F 220/1811; C08F 220/58; C08F 2/50; C08F 290/067; C08F 222/102; C08F 222/1065; B33Y 80/00; B33Y 10/00; B33Y 70/00
USPC ................. 522/64, 6, 189, 184, 71, 1; 520/1
See application file for complete search history.

(56) References Cited

U.S. PATENT DOCUMENTS

| | | |
|---|---|---|
| 2018/0100075 A1 | 4/2018 | Chopra et al. |
| 2018/0147776 A1 | 5/2018 | Kotani ................. B29C 64/112 |
| 2019/0009453 A1 | 1/2019 | Kitou et al. |
| 2019/0009457 A1 | 1/2019 | Watanabe ............. B29C 64/124 |
| 2020/0140318 A1 | 5/2020 | Fujino ..................... C03C 1/026 |

FOREIGN PATENT DOCUMENTS

| | | |
|---|---|---|
| EP | 2 436 510 A1 | 10/2010 |
| JP | H 10-30002 A | 2/1998 |
| JP | 2014-000820 A | 1/2014 |
| JP | 2014-159556 A | 9/2014 |
| JP | 2017-210539 A | 11/2017 |

(Continued)

OTHER PUBLICATIONS

Iwai et al, WO 2015030030 Machine Translation, Mar. 5, 2015 (Year: 2015).*
Extended European Search Report dated Feb. 2, 2022, issued by the European Patent Office in corresponding application EP 207783705.
International Search Report dated Jun. 16, 2020, issued to International Application No. PCT/JP2020/013668.
European Office Action dated Oct. 14, 2022, issued by the European Patent Office in corresponding application EP 20 778 370.5.

*Primary Examiner* — Jessica Whiteley
(74) *Attorney, Agent, or Firm* — Stein IP LLC

(57) ABSTRACT

A photocurable composition for three-dimensional modeling capable of high-speed modeling, a three-dimensional modeled object using the composition, and a method for producing the three-dimensional modeled object is provided. A photocurable composition for three-dimensional modeling, comprising a polymerizable organic compound component is provided. The photocurable composition has a steady flow viscosity of 30,000 mPa s or less measured with a rotary rheometer at 25° C. and a shear rate of 0.01 per second. When the photocurable composition for three-dimensional modeling is irradiated with a light having a light intensity of 1.3 mW/cm2, G' becomes $1 \times 10^6$ Pa or more after a start of photopolymerization in an integrated light irradiation time of 4 seconds or less. After the start of photopolymerization, a maximum value of tan δ on and after a gel point is 0.5 or more. The gel point is the point where G'=G" is satisfied for the first time after the start of photopolymerization. G' is a storage shear modulus, G' is loss shear modulus, and tan δ is a loss tangent, each of which is calculated based on measurement data for 30 seconds per one measurement, measured with a rotary rheometer having a pair of parallel plate with a diameter of 10 mm and a measurement gap of 0.1 mm at a strain of 0.5% or less, a frequency of 0.1 Hz, and 25° C.

13 Claims, 10 Drawing Sheets

(56) References Cited

FOREIGN PATENT DOCUMENTS

| WO | WO-2015030030 A1 * | 3/2015 | ............. B32B 27/06 |
| WO | WO 2017/018525 A1 | 2/2017 | |
| WO | WO 2017/033427 A1 | 3/2017 | |
| WO | WO 2018/235943 A1 | 12/2018 | |
| WO | WO 2019/021451 A1 | 1/2019 | |
| WO | WO-2019021451 A1 * | 1/2019 | ........... B29C 64/124 |

* cited by examiner

PHOTOCURABLE COMPOSITION FOR THREE-DIMENSIONAL MOLDING, THREE-DIMENSIONAL MOLDED PRODUCT, AND METHOD FOR PRODUCING THREE-DIMENSIONAL MOLDED PRODUCT

CROSS-REFERENCE TO RELATED APPLICATIONS

This application is a national stage of International Application No. PCT/JP2020/013668, filed Mar. 26, 2020, which claims the benefit of Japanese Application No. 2019-062349, filed Mar. 28, 2019, in the Japanese Patent Office, the disclosures of which are incorporated herein by reference.

TECHNICAL FIELD

The present invention relates to a photocurable composition for three-dimensional modeling, a three-dimensional modeled object using the composition, and a method for producing a three-dimensional modeled object.

BACKGROUND ART

In recent years, a technique for producing a three-dimensional modeled object by laminate modeling has been developed. A three-dimensional model made of a resin material is modeled by irradiating a photocurable composition with light.

As a photocurable composition, various component compositions have been studied in consideration of the characteristics of the obtained three-dimensional modeled object, and an example using a composition containing a (meth) acrylic acid ester has also been reported (Patent Literature 1).

CITATION LIST

Patent Literature

Patent Literature 1: JP2017-210539A

SUMMARY OF INVENTION

Technical Problem

However, it is a practical problem that modeling takes a long time, and there is a demand for shortening the modeling time.

The present invention has been made in view of such a problem and provides a photocurable composition for three-dimensional modeling capable of high-speed modeling, a three-dimensional modeled object using the composition, and a method for producing the three-dimensional modeled object.

Solution to Problem

According to the present invention, a photocurable composition for three-dimensional modeling, comprising a polymerizable organic compound component, wherein:

the photocurable composition has a steady flow viscosity of 30,000 mPa·s or less measured with a rotary rheometer at 25° C. and a shear rate of 0.01 per second, when the photocurable composition for three-dimensional modeling is irradiated with a light having a light intensity of 1.3 mW/cm$^2$, G' becomes $1 \times 10^6$ Pa or more after a start of photopolymerization in an integrated light irradiation time of 4 seconds or less, after the start of photopolymerization, a maximum value of tan δ on and after a gel point is 0.5 or more, the gel point is a point where G'=G" is satisfied for the first time after the start of photopolymerization, G' is a storage shear modulus, G" is a loss shear modulus, and tan δ is a loss tangent, each of which is calculated based on measurement data for 30 seconds per one measurement, measured with a rotary rheometer having a pair of parallel plate with a diameter of 10 mm and a measurement gap of 0.1 mm at a strain of 0.5% or less, a frequency of 0.1 Hz, and 25° C. is provided.

The inventors have conducted an intensive study and have found that the characteristics of the composition to be satisfied in order to shorten the modeling time in high-speed modeling are a steady flow viscosity of the composition before light irradiation and a storage shear modulus of cured product within a predetermined integrated light irradiation time, and a loss tangent when the storage shear modulus and a loss shear modulus have a predetermined relationship and have completed the present invention.

Hereinafter, various embodiments of the present invention will be illustrated. The embodiments shown below can be combined with each other.

Preferably, the photocurable composition for three-dimensional modeling, wherein the polymerizable organic compound component comprises:

at least one selected from the group of a monofunctional (meth) acrylic acid ester monomer and a monofunctional (meth) acrylamide-based monomer; and a polyfunctional (meth) acrylic acid ester monomer.

Preferably, the photocurable composition for three-dimensional modeling, wherein a content of the polyfunctional (meth) acrylic acid ester monomer is 6 to 50% by mass in 100% by mass of the polymerizable organic compound component.

Preferably, the photocurable composition for three-dimensional modeling, wherein the monofunctional (meth) acrylic acid ester monomer contains a monofunctional (meth) acrylic acid ester monomer having a cyclic structure.

Preferably, the photocurable composition for three-dimensional modeling, wherein the polyfunctional (meth) acrylic acid ester monomer contains a polyfunctional (meth) acrylic acid ester monomer having a cyclic structure.

Preferably, the photocurable composition for three-dimensional modeling, wherein the cyclic structure is a polycyclic structure or an alicyclic hydrocarbon group.

Preferably, the photocurable composition for three-dimensional modeling, which contains a urethane (meth) acrylate oligomer.

Preferably, the photocurable composition for three-dimensional modeling, which contains a photopolymerization initiator.

Further, according to another aspect of the present invention, a three-dimensional modeled object containing the above photocurable composition for three-dimensional modeling or a cured product thereof is provided.

Further, according to another aspect of the present invention, a method for producing a three-dimensional modeled object, comprising a step of irradiating the above photocurable composition for three-dimensional modeling is provided.

Preferably, the method for producing a three-dimensional modeled object, wherein the irradiating is irradiating by a surface exposure method.

DESCRIPTION OF EMBODIMENTS

The embodiments of the present invention will be described below. The features shown in the embodiments shown below can be combined with each other. In addition, the invention is established independently for each feature.

In the present specification, the symbol "-(to)" means "greater than or equal to" and "less than or equal to", and for example, the description "A-B (A to B)" means more than or equal to A and less than or equal to B.

1. Photocurable Composition for Three-Dimensional Modeling

The photocurable composition for three-dimensional modeling according to one embodiment of the present invention is a photocurable composition for three-dimensional modeling containing a polymerizable organic compound component.

(Steady Flow Viscosity)

The photocurable composition for three-dimensional modeling according to one embodiment of the present invention has a steady flow viscosity of 30,000 mPa·s or less measured with a rotary rheometer at 25° C. and a shear rate of 0.01 per second. The steady flow viscosity is preferably 10000 mPa·s or less, more preferably 1000 mPa·s or less, and further preferably 100 mPa·s or less. The lower limit of the steady flow viscosity is not particularly limited, and is practically 1 mPa·s or more, and more preferably 5 mPa·s or more. When the steady flow viscosity is in the above range, the composition can fill the space in a short time.

Figure 1A:
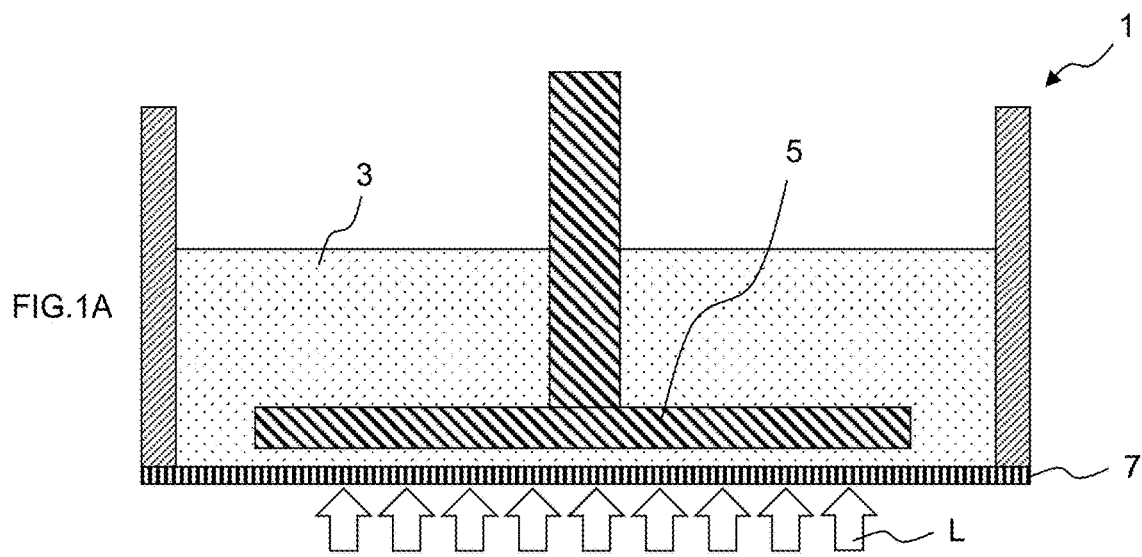
FIG. 1A to 1C are schematic diagrams of a method for producing a three-dimensional modeled object according to an embodiment of the present invention.
Figure 1B:
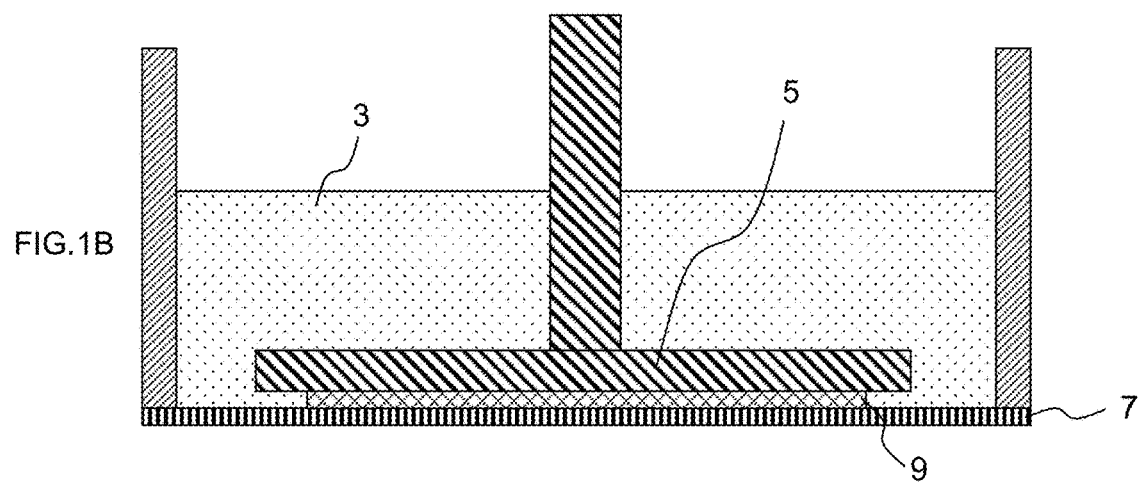
Figure 1C:
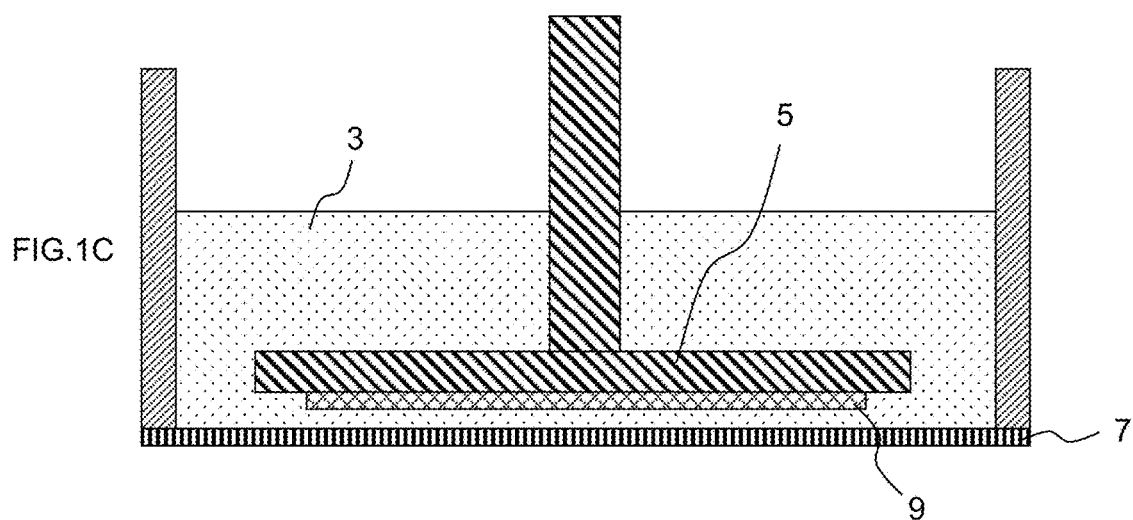

Here, filling with the composition means filling with the composition to form the next layer after forming a layer of the cured product by irradiating the composition with light. As an example of filling with the composition, a case where the modeling apparatus 1 as shown in FIG. 1 is used will be described. Here, a modeled object is produced by a surface exposure method (DLP method: Digital Light Processing method) in which light is irradiated from below. A composition 3 is irradiated with light L (FIG. 1A) to form a first layer composed of a cured layer 9 of the composition 3 between a modeling substrate 5 and a modeling film 7 (FIG. 1B). After that, the cured layer 9 (the nth layer) is peeled off from the modeling film 7, and the composition flows into the formed space to prepare for forming the next layer (the n+1th layer) (FIG. 1C). That is, the filling with the composition is that the composition flows into the space between the modeling film 7 and the cured layer 9 in FIG. 1B to 1C. In other words, since the steady flow viscosity is in the above range, the time required for the composition to fill the space formed by peeling the cured layer 9 from the modeling film 7 is shortened. Further, when the steady flow viscosity is too large, the composition may not flow into the space.

It should be noted that the "steady flow viscosity measured with a rotary rheometer at 25° C. and a shear rate of 0.01 per second" means not only the measured value but also a value (extrapolation value) obtained by extrapolation (extrapolation). In the case of a low-viscosity sample, the measured value at a shear rate of 0.01 per second may not accurately represent the physical properties of itself due to problems in the measurement accuracy of the stress/strain sensor of the apparatus. Therefore, when an accurate value may not be obtained by measurement at a shear rate of 0.01 per second, an extrapolation value at a shear rate of 0.01 per second will be calculated based on the measured value at a faster shear rate, and the extrapolation value is treated as the steady flow viscosity measured with a rotary rheometer at a shear rate of 0.01 per second. More specifically, for example, in the case that the rotary rheometer MCR302 manufactured by Anton Paar GmbH is used, when the steady flow viscosity at a shear rate of 0.01 per second is less than 5000 mPa·s and 1000 mPa·s or more, each of steady flow viscosity at 0.1 per second, 1 per second, and 10 per second is measured, and each measured value is plotted on a log-log graph with the vertical axis as the steady flow viscosity and the horizontal axis as the shear rate, and the extrapolation value at a shear rate of 0.01 per second is calculated by drawing an approximate straight line. When the steady flow viscosity at a shear rate of 0.01 per second is less than 1000 mPa·s and 100 mPa·s or more, each of steady flow viscosity at 1 per second, 10 per second, and 100 per second is measured, and each measured value is plotted on a log-log graph with the vertical axis as the steady flow viscosity and the horizontal axis as the shear rate, and the extrapolation value at a shear rate of 0.01 per second is calculated by drawing an approximate straight line. When the steady flow viscosity at a shear rate of 0.01 per second is less than 100 mPa·s and 10 mPa·s or more, each of steady flow viscosity at 10 per second, 100 per second, and 1000 per second is measured, and each measured value is plotted on a log-log graph with the vertical axis as the steady flow viscosity and the horizontal axis as the shear rate, and the extrapolation value at a shear rate of 0.01 per second is calculated by drawing an approximate straight line.

(Storage Shear Modulus)

When the photocurable composition for three-dimensional modeling according to one embodiment of the present invention is irradiated with a light having a light intensity of 1.3 mW/cm$^2$, G' of the photocurable composition for three-dimensional modeling is $1 \times 10^6$ Pa or more after a start of photopolymerization in an integrated light irradiation time of 4 seconds or less, and preferably $1.5 \times 10^6$ Pa or more, and more preferably $2 \times 10^6$ Pa or more. Further, the integrated light irradiation time may need to be 2 seconds or more. Further, the integrated light irradiation time required to satisfy the above-mentioned predetermined value regarding G' is preferably 3.5 seconds or less, more preferably 3 seconds or less, and further preferably 2.5 seconds or less from the viewpoint of high-speed modeling. When the G' is in the above range, the modeled object has the storage shear modulus required to maintain its shape even when irradiated with light for a short period of time, and discontinuity in the modeled object is unlikely to occur so that modeling can be performed in a short time. The wavelength of the irradiation light is preferably 405 nm.

G' is a storage shear modulus, G" is a loss shear modulus, and tan δ is a loss tangent, each of which is calculated based on measurement data for 30 seconds per one measurement, measured with a rotary rheometer having a pair of parallel plate with a diameter of 10 mm and a measurement gap of 0.1 mm at a strain of 0.5% or less, a frequency of 0.1 Hz, and 25° C. Calculation based on measurement data for 30 seconds means calculation based on raw data obtained by continuous measurement for 30 seconds. In other words, raw data for 30 seconds per one measurement is read into an apparatus, and the apparatus performed measurement and calculation.

The light irradiation and the measurement are not particularly limited as long as the method satisfies the above conditions, and as an example, it includes a method in which an irradiation step and a measurement step are alternately performed as follows.

Irradiation Step: Irradiating with Light for Xn Seconds

Measurement step: Immediately after stopping light irradiation, measurement is started with a rotary rheometer, and measurement for 30 seconds per one measurement is performed twice. (It takes 60 seconds for two measurements. That is, it takes 60 seconds from the stop light irradiation to the next light irradiation.)

Xn is any positive real number (e.g., 0.5) and may be the same or different in each irradiation step. The total of Xn (X1+X2+X3 . . . +Xn) is an integrated light irradiation time. For example, all Xn may be 0.5, and one cycle of the irradiation step and the measurement step may be performed in 60.5 seconds. When evaluating physical properties in an integrated light irradiation time of 4 seconds or less, it is naturally preferable that Xn is 4 seconds or less.

When the measurement is performed twice in the measurement step as described above, it is determined that the condition is satisfied in the case that the storage shear modulus G' exceeds a predetermined value in any of the measurements. The storage shear modulus G' in the latter of the two measurements is often high.

(Loss Tangent)

In the photocurable composition for three-dimensional modeling according to one embodiment of the present invention, after the start of photopolymerization, a maximum value of tan δ on and after a gel point is 0.5 or more, preferably 0.53 or more, more preferably 0.6 or more, and even more preferably 0.8 or more. The maximum value of tan δ means a value calculated by measuring the composition, which was irradiated with light, initiated polymerization, and is curing on and after the gel point (at least a part of the composition was polymerized by light irradiation). The upper limit of the maximum value of the tan δ is not particularly limited, and in some cases, it is preferably 10 or less, more preferably 5 or less, and even more preferably 2 or less, in consideration of the recovery of strain in the cleaning step and the additional curing step after molding.

When the maximum value of the tan δ is in the above range, delamination is unlikely to occur, so that modeling can be performed in a short time.

Figure 9A:
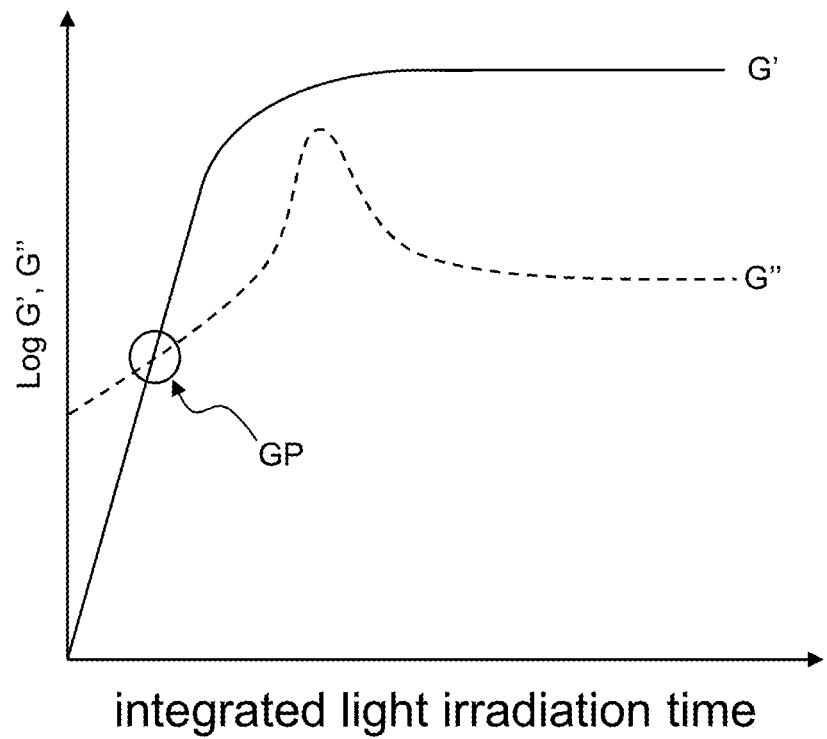
FIGS. 9A and 9B are schematic diagrams showing a gel point in a relationship of G' and G" with respect to integrated light irradiation time.
Figure 9B:
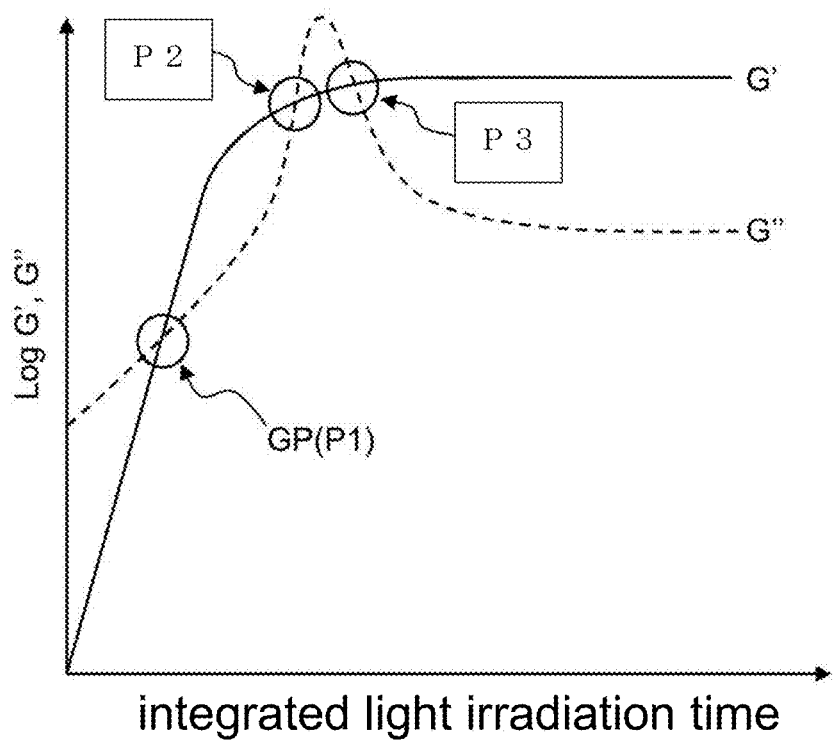
Figure 10A:
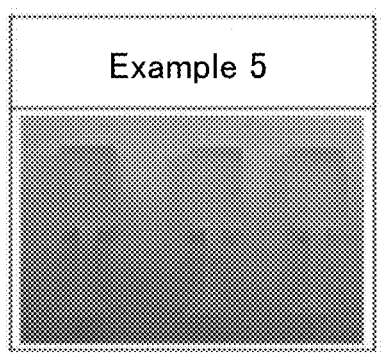
FIGS. 10A and 10B are diagrams showing photographs of modeled objects of moldability evaluation models M1 and M2 in Example 5.
Figure 10B:
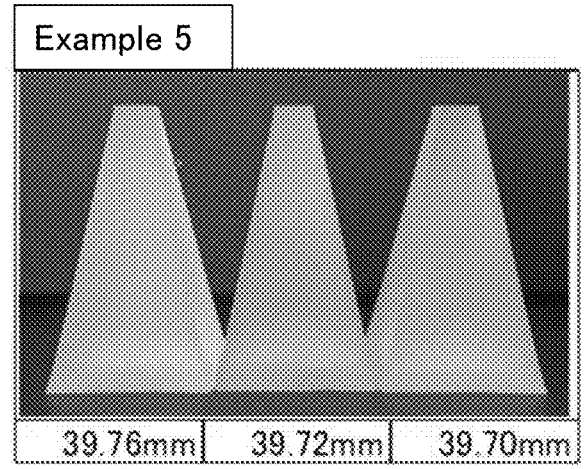

Here, "a gel point" in the present specification means a point where G'=G" is satisfied for the first time after the start of photopolymerization. In FIG. 9A, the intersection (then G'>G") corresponds to the gel point GP. Further, when G'=G" is satisfied for the first time after the start of photopolymerization and then G'=G" is observed again, the latter is not called a gel point. As shown in FIG. 9B, in the case that G'=G" is observed and then G'>G" is observed and then G'<G" is observed again, there are a plurality of intersections in which" G'=G" is observed. That is, in FIG. 9B, the first intersection P1, the second intersection P2, and the third intersection P3 exist, but only the first intersection P1 is referred to as a gel point (GP).

As for tan δ, the matters described for the measurement of the storage shear modulus G' are applied properly. That is, when two measurements are performed in the measurement step, it is determined that the condition is satisfied in the case that the loss tangent tan δ exceeds a predetermined value in any of the measurements.

The delamination between layers means that at least one set of layers is separated from each other, that is, the layers do not adhere to each other. When such delamination occurs, further modeling cannot be performed. It means that, for example, in the production of a modeled object by the process as shown in FIG. 1, when the nth layer is formed and then the nth layer is peeled off from the modeling film 7, peeling occurs between the mth layer and the m−1th layer (2≤m≤n).

Each of the above three conditions regarding the steady flow viscosity, the storage shear modulus, and the loss tangent can contribute to high-speed modeling by itself, but by satisfying all of them, a highly accurate modeled object as designed can be obtained in a short time with high probability.

That is, photocurable composition for three-dimensional modeling of the present invention contains a polymerizable organic compound component and is not limited as long as the above conditions are satisfied, and a preferable component in one embodiment will be described below.

(Polymerizable Organic Compound Component)

In the photocurable composition for three-dimensional modeling according to one embodiment of the present invention, the polymerizable organic compound component preferably contains a (meth) acrylic acid-based monomer. Here, the (meth) acrylic acid-based monomer is a general term for a (meth) acrylic acid ester monomer, a (meth) acrylamide-based monomer, and a (meth) acrylic acid monomer, and they may be called (meth) acrylate.

More preferably, the polymerizable organic compound comprises:

at least one selected from the group of a monofunctional (meth) acrylic acid ester monomer and a monofunctional (meth) acrylamide-based monomer; and a polyfunctional (meth) acrylic acid ester monomer.

The monofunctional (meth) acrylic acid ester monomer refers to a compound having one (meth) acryloyl group. The polyfunctional (meth) acrylic acid ester monomer refers to a compound having two or more (meth) acryloyl groups.

The monofunctional (meth) acrylamide-based monomer refers to a (meth) acrylamide compound having one (meth) acryloyl group.

When the polymerizable organic compound comprises at least one selected from the group of a monofunctional (meth) acrylic acid ester monomer and a monofunctional (meth) acrylamide-based monomer and a polyfunctional (meth) acrylic acid ester monomer, the content of the monofunctional (meth) acrylate ester monomer is preferably 50 to 94% by mass, more preferably 55 to 90% by mass, even more preferably 60 to 85% by mass in 100% by mass of the polymerizable organic compound component.

When the polymerizable organic compound comprises at least one selected from a monofunctional (meth) acrylic acid ester monomer and a monofunctional (meth) acrylamide-based monomer and a polyfunctional (meth) acrylic acid ester monomer, the content of the polyfunctional (meth) acrylate ester monomer is preferably 6 to 50% by mass, more preferably 10 to 45% by mass, and even more preferably 15 to 40% in 100% by mass of the polymerizable organic compound component. Specifically, the content of the polyfunctional (meth) acrylic acid ester monomer is, for example, 6, 8, 10, 15, 20, 25, 30, 35, 40, 45, 50% by mass, and may be in the range between the two values exemplified herein.

By adopting such a proportion for the polymerizable organic compound component, it becomes easy to satisfy the above-mentioned storage shear modulus and loss tangent.

From another aspect, when the total amount of by mole (mol) of the monofunctional (meth) acrylic acid ester monomer and the monofunctional (meth) acrylamide-based monomer (hereinafter, these two are referred to as "monofunctional (meth) acrylamide-based monomer and the like"), and the polyfunctional (meth) acrylic acid ester monomer is 100% by mol, in the polymerizable organic compound component, a total value (%) of a value, which is calculated by dividing the mole fraction $M_S$ (mol %) of the monofunctional (meth) acrylic acid ester monomer and the like by the number of (meth) acryloyl groups $A_S$ (mol) of the monofunctional (meth) acrylic acid ester monomer and the like (that is, 1 mol), and a value, which is calculated by dividing the mole fraction $M_M$ (mol %) of the polyfunctional (meth) acrylic acid ester monomer by the number of (meth) acryloyl groups $A_M$ (mol) of the polyfunctional (meth) acrylic acid ester monomer (2 mol in the case of biofunctionality), is preferably 76 to 97%, more preferably 80 to 96%. The total value is calculated by the following formula (1), and specifically, for example, 76, 77, 78, 79, 80, 81, 82, 83, 84, 85, 86, 87, 88, 89, 90, 91, 92, 93, 94, 95, 96, 97%, and may be within the range between any two of the numerical values exemplified here.

$$MS(\text{mol \%})/AS(\text{mol})+MM(\text{mol \%})/AM(\text{mol}) \quad (1)$$

The monofunctional (meth) acrylic acid ester monomer preferably contains a monofunctional (meth) acrylic acid ester monomer having a cyclic structure, and more preferably the cyclic structure is a polycyclic structure and an alicyclic hydrocarbon group. The cyclic structure is more preferably a polycyclic structure and a saturated hydrocarbon group. Further, the monofunctional (meth) acrylic acid ester monomer preferably includes a monofunctional (meth) acrylic acid ester monomer which does not have all of an ether bond, an aromatic ring, and heteroatoms other than oxygen, and more preferably does not have any of an ether bond, an aromatic ring, and heteroatoms other than oxygen.

The monofunctional (meth) acrylamide-based monomer preferably contains a monofunctional (meth) acrylamide-based monomer having a cyclic structure, and more preferably the cyclic structure contains a hetero atom such as an oxygen atom or a nitrogen atom.

The acrylic equivalent of the monofunctional (meth) acrylic acid ester monomer is preferably 160 to 250, more preferably 180 to 220, and even more preferably 200 to 215.

The acrylic equivalent of the monofunctional (meth) acrylic acid ester monomer is a value obtained by dividing the molecular weight of the monofunctional (meth) acrylic acid ester monomer by the number of functional groups of the (meth) acryloyl group.

The acrylic equivalent of the monofunctional (meth) acrylamide-based monomer is preferably 100 to 200, more preferably 120 to 180, and even more preferably 130 to 160. The acrylic equivalent of the monofunctional (meth) acrylamide-based monomer is a value obtained by dividing the molecular weight of the monofunctional (meth) acrylamide-based monomer by the number of functional groups of the (meth) acryloyl group.

The molecular weight of the monofunctional (meth) acrylic acid ester monomer is preferably 160 to 250, more preferably 180 to 220, and even more preferably 200 to 215.

The molecular weight of the monofunctional (meth) acrylamide-based monomer is preferably 100 to 200, more preferably 120 to 180, and even more preferably 130 to 160.

Examples of monofunctional (meth) acrylic acid ester monomers include:

acyclic aliphatic (meth) acrylates such as methyl (meth) acrylate, ethyl (meth) acrylate, n-butyl (meth) acrylate, iso-butyl (meth) acrylate, t-butyl (meth) acrylate, 2-ethylhexyl (meth) acrylate, nonyl (meth) acrylate, tridecyl (meth) acrylate, hexadecyl (meth) acrylate, octadecyl (meth) acrylate, isoamyl (meth) acrylate, isodecyl (meth) acrylate, isostearyl (meth) acrylate, and lauryl (meth) acrylate;

aromatic (meth) acrylates such as benzyl (meth) acrylate, nonylphenoxyethyl (meth) acrylate, 2-hydroxy-3-phenoxypropyl (meth) acrylate, nonylphenoxyethyl tetrahydrofurfuryl (meth) acrylate, and phenoxyethyl (meth) acrylate;

alicyclic (meth) acrylates such as dicyclopentenyl (meth) acrylate, dicyclopentanyl (meth) acrylate, dicyclopentenyloxyethyl (meth) acrylate, tetracyclododecanyl (meth) acrylate, cyclohexyl (meth) acrylate, isobornyl (meth) acrylate, norbornyl (meth) acrylate, adamantan-1-yl (meth) acrylate, and 2-(meth) acryloyloxymethyl-2-methyladamantan;

hydroxyalkyl (meth) acrylates such as 2-hydroxyethyl (meth) acrylate, 2-hydroxypropyl (meth) acrylate, 4-hydroxybutyl (meth) acrylate, and 3-chloro-2-hydroxypropyl (meth) acrylate;

ethoxyethoxyethyl (meth) acrylate, methoxyethyl (meth) acrylate, butoxyethyl (meth) acrylate, tetrahydrofurfuryl (meth) acrylate, glycidyl (meth) acrylate, caprolactone-modified tetrahydrofurfuryl (meth) acrylate, 4-t-butylcyclohexyl (meth) acrylate, urethane mono (meth) acrylate, and (meth) acrylic acid.

Among alicyclic (meth) acrylates, alicyclic (meth) acrylic acid ester is preferable. Among alicyclic (meth) acrylic acid esters, one or more selected from the group consisting of dicyclopentanyl (meth) acrylate, tetracyclododecanyl (meth) acrylate, isobornyl (meth) acrylate, norbornyl (meth) acrylate, and adamantane-1-yl (meth) acrylate is preferable.

Among these, one or more of selected from the group consisting of an acyclic aliphatic (meth) acrylic acid ester and an alicyclic (meth) acrylic acid ester is preferable, and an alicyclic (meth) acrylic acid ester is more preferable.

Isobornyl (meth) acrylate is preferable from the viewpoint of availability and glass transition temperature and the like.

These can be used alone, or two or more of these can be used in combination.

Examples of the monofunctional (meth) acrylamide-based monomer include (meth) acryloylmorpholine, dimethyl (meth) acrylamide, diethyl (meth) acrylamide, hydroxyethyl (meth) acrylamide, isopropyl (meth) acrylamide, dimethylaminopropyl (meth) acrylamide and N-(meth)

acryloyloxyethyl hexahydrophthalimide. From the viewpoint of availability, glass transition temperature, and the like, (meth) acryloylmorpholin or N-(meth) acryloyloxyethyl hexahydrophthalimide is preferable, and (meth) acryloylmorpholin is particularly preferable.

These can be used alone, or two or more of these can be used in combination.

Even when a preferable monofunctional (meth) acrylic acid ester monomer or preferable monofunctional (meth) acrylamide-based monomer is used, other monofunctional (meth) acrylic acid esters or other monofunctional (meth) acrylamide-based monomers may be contained as long as the effects of the present invention are not impaired. For example, a preferable monofunctional (meth) acrylic acid ester monomer may be a main component, and more specifically, the content of the preferable monofunctional (meth) acrylic acid ester monomer is preferably 50% by mass or more, more preferably 90% by mass or more, and even more preferably substantially 100% by mass in 100% by mass of the monofunctional (meth) acrylic acid monomer. Further, from the viewpoint of availability, glass transition temperature, and the like, it is preferable that the monofunctional (meth) acrylic acid ester monomer is substantially composed of isobornyl (meth) acrylate only.

Examples of the polyfunctional (meth) acrylic acid ester monomer include a bifunctional (meth) acrylic acid ester monomer, a trifunctional (meth) acrylic acid ester monomer, and a tetrafunctional or higher functional (meth) acrylic acid ester monomer.

The acrylic equivalent of the polyfunctional (meth) acrylic acid ester monomer is preferably 80 to 200, more preferably 100 to 180, and even more preferably 120 to 160. The acrylic equivalent of the polyfunctional (meth) acrylic acid ester monomer is a value obtained by dividing the molecular weight of the polyfunctional (meth) acrylic acid ester monomer by the number of functional groups of the (meth) acryloyl group.

The molecular weight of the polyfunctional (meth) acrylic acid ester monomer is preferably 200 to 2000, more preferably 250 to 1500, and even more preferably 280 to 1000.

Examples of the bifunctional (meth) acrylic acid ester monomer include:

alicyclic di (meth) acrylic acid ester monomers such as 1,3-adamantane dimethanol di (meth) acrylate, tricyclodecane dimethanol di (meth) acrylate, and 1,3-butanediol di (meth) acrylate;

alcan diol di (meth) acrylic acid ester monomers such as 1,4-butanediol di (meth) acrylate, 1,6-hexadioldi (meth) acrylate, 1,9-nonanediol di (meth) acrylate, and 1,10-decanediol di (meth) acrylate;

di (meth) acrylic acid ester monomers having a neopentyl glycol structure such as neopentyl glycol di (meth) acrylate and neopentyl glycol-modified trimethylolpropane di (meth) acrylate;

(poly) alkylene glycol di (meth) acrylic acid ester monomers such as tetramethylene glycol di (meth) acrylate, diethylene glycol di (meth) acrylate, triethylene glycol di (meth) acrylate, tetraethylene glycol di (meth) acrylate, polyethylene glycol di (meth) acrylate, propylene glycol di (meth) acrylate, dipropylene glycol di (meth) acrylate, tripropylene glycol di (meth) acrylate, polypropylene glycol di (meth) acrylate;

di (meth) acrylic acid ester monomers having a bisphenol structure such as 2,2-bis (4-(meth) acryloxidiethoxyphenyl) propane, 2,2-bis (4-(meth) acryloxipropoxyphenyl) propane, 2,2-bis (4-(meth) acryloxy) tetraethoxyphenyl propane;

stearic acid-modified pentaeristoldi (meth) acrylate, isocyanuric acid ethylene oxide-modified di (meth) acrylate, and diglycerin EO (ethylene oxide)-modified di (meth) acrylate.

Examples of the trifunctional (meth) acrylic acid ester monomer include isocyanurate ethylene oxide-modified tri (meth) acrylate, pentaerythritol tri (meth) acrylate, trimethylolpropane tri (meth) acrylate, and tris [(meth) acryloixi ethyl] isocyanurate and the like.

Examples of the tetrafunctional or higher functional (meth) acrylic acid ester monomer include ditrimethylolpropane tetra (meth) acrylate, dimethylolpropanetetra (meth) acrylate, pentaerythritol tetra (meth) acrylate, and pentaerythritol ethoxytetra (meth) acrylate, dipentaerythritol penta (meth) acrylate, dipentaerythritol hexa (meth) acrylate and the like.

The polyfunctional (meth) acrylic acid ester monomer preferably has a cyclic structure, more preferably the cyclic structure is a polycyclic structure or an alicyclic hydrocarbon group, and further preferably the cyclic structure is a polycyclic structure and a saturated hydrocarbon group. Further, the polyfunctional (meth) acrylic acid ester monomer preferably does not have all of an ether bond, an aromatic ring, and heteroatoms other than an oxygen, and more preferably does not have any of an ether bond, an aromatic ring, and heteroatoms other than an oxygen. From another point of view, the polyfunctional (meth) acrylic acid ester monomer is preferably a bifunctional (meth) acrylic acid ester monomer.

Among these, one or more of the group consisting of an alicyclic di (meth) acrylic acid ester monomer, a (poly) alkylene glycol di (meth) acrylic acid ester monomer, a trimethylolpropane tri (meth) acrylate, a diglycerin EO-modified di (meth) acrylate is preferable.

Among the alicyclic di (meth) acrylic acid ester monomers, one or more of the group consisting of 1,3-adamantane dimethanol di (meth) acrylate and tricyclodecanedimethanol di (meth) acrylate is preferable.

Among the (poly) alkylene glycol di (meth) acrylic acid ester monomers, one or more of the group consisting of tetramethylene glycol di (meth) acrylate, diethylene glycol di (meth) acrylate, triethylene glycol di (meth) acrylate, tetraethylene glycol di (meth) acrylate, polyethylene glycol di (meth) acrylate, propylene glycol di (meth) acrylate, dipropylene glycol di (meth) acrylate, tripropylene glycol di (meth) acrylate, polypropylene glycol di (meth) acrylate is preferable.

Furthermore, among these, one or more of the group consisting of 1,3-adamantan dimethanol di (meth) acrylate, tricyclodecane dimethanol di (meth) acrylate, tetramethylene glycol di (meth) acrylate, diethylene glycol di (meth) acrylate, triethylene glycol di (meth) acrylate, tetraethylene glycol di (meth) acrylate, polyethylene glycol di (meth) acrylate, propylene glycol di (meth) acrylate, dipropylene glycol di (meth) acrylate, tripropylene glycol di (meth) acrylate, polypropylene glycol di (meth) acrylate, trimethylolpropane tri (meth) acrylate, and diglycerin EO-modified di (meth) acrylate is preferable, and one or more of the group consisting of tricyclodecanedimethanol di (meth) acrylate, diethylene glycol di (meth) acrylate, triethylene glycol di (meth) acrylate, tetraethylene glycol di (meth) acrylate, propylene glycol di (meth) acrylate, dipropylene glycol di (meth) acrylate, tripropylene glycol di (meth) acrylate, trimethylolpropane tri (meth) acrylate and diglycerin EO-modified di (meth) acrylate is preferable.

Furthermore, from the viewpoint of molding speed, one or more of the group consisting of tricyclodecanedimethanol di (meth) acrylate, propylene glycol di (meth) acrylate, dipropylene glycol di (meth) acrylate, tripropylene glycol di (meth) acrylate, trimethylolpropane tri (meth) acrylate and diglycerin EO-modified di (meth) acrylate is preferable.

These can be used alone, or two or more of these can be used in combination.

Even when a preferable polyfunctional (meth) acrylic acid ester monomer is used, other polyfunctional (meth) acrylic acid ester monomers may be contained as long as the effect of the present invention is not impaired. For example, a preferable polyfunctional (meth) acrylic acid ester monomer may be a main component, and more specifically, the content of the preferable polyfunctional (meth) acrylic acid ester is preferably 50% by mass or more, more preferably 90% by mass or more, and even more preferably substantially 100% by mass in 100% by mass of the polyfunctional (meth) acrylic acid monomer. Further, from the viewpoint of molding speed, it is preferable that the polyfunctional (meth) acrylic acid ester monomer is substantially composed of only tricyclodecanedimethanol di (meth) acrylate, and only tricyclodecanedimethanol diacrylate.

Further, the polymerizable organic compound component may contain a monomer such as another vinyl compound or an epoxy compound as long as the effect of the present invention is not impaired.

Examples of the vinyl compound include vinylpyrrolidone, N-vinylformamide and the like.

Further, the polymerizable organic compound component may contain a urethane (meth) acrylate oligomer. The urethane (meth) acrylate oligomer has at least one urethane bond and at least one (meth) acrylate group in the molecule. By containing the urethane (meth) acrylate oligomer, the toughness of the modeled object obtained after modeling can be improved. Further, the addition of the urethane (meth) acrylate oligomer is preferable from the viewpoint of curing shrinkage in high-speed modeling and can contribute to the bending strength of the modeled object by stress relaxation in a low temperature region.

The urethane (meth) acrylate oligomer is preferably a polyfunctional urethane (meth) acrylate oligomer. The polyfunctional urethane (meth) acrylate oligomer is preferably a bifunctional or higher functional urethane (meth) acrylate oligomer, more preferably a 2 to 15 functional urethane (meth) acrylate oligomer, and further preferably a 2 to 6 functional urethane, most preferably a bifunctional urethane (meth) acrylate oligomer.

Examples of the urethane (meth) acrylate oligomer preferably do not include the polyfunctional (meth) acrylic acid ester monomer described above. The polyfunctional (meth) acrylic acid ester monomer described above preferably does not include an urethane (meth) acrylate oligomer.

The urethane (meth) acrylate oligomer is composed of an active hydrogen group-containing polyol component (a), a diisocyanate component (b), and an active hydrogen group-containing (meth) acrylic component (c).

Examples of the component (a) include polyethylene glycol, polypropylene glycol, polytetramethylene glycol, ethylene oxide-modified bisphenol, propylene oxide-modified bisphenol, polyglycol obtained by copolymerization of ethylene oxide and propylene oxide, polyester polyol, polycarbonate polyol, polybutadiene polyol. These can be used alone, or two or more of these can be used in combination.

Examples of the component (b) is, for example, tolylene diisocyanate, xylylene diisocyanate, diphenylmethane diisocyanate, hexamethylene diisocyanate, trimethylhexamethylene diisocyanate, tetramethylxylylene diisocyanate, isophorone diisocyanate, hydrogenated tolylene diisocyanate, hydrogenated xylylene diisocyanate and hydrogenated diphenylmethane diisocyanate. These can be used alone, or two or more of these can be used in combination.

Examples of the component (c) include hydroxyalkyl (meth) acrylates such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, pentaerythritol triacrylate, pentaerythritol trimethacrylate. These can be used alone, or two or more of these can be used in combination.

Here, the urethane (meth) acrylate oligomer may be obtained, for example, by reacting the active hydrogen group-containing polyol component (a), the diisocyanate component (b), and the active hydrogen group-containing (meth) acrylic component (c) (for example, a polycondensation reaction).

The weight average molecular weight of the urethane (meth) acrylate oligomer is preferably 1000 to 60,000, more preferably 3000 to 40,000, and most preferably 5000 to 10000. The weight average molecular weight is preferably determined by preparing a calibration curve with commercially available standard polystyrene using tetrahydrofuran as a solvent and using a GPC system (SC-8010 manufactured by Tosoh Corporation) under the following conditions.

Flow velocity: 1.0 ml/min
Set temperature: 40° C.
Column Configuration:
"TSK guardcolum MP (xL)" 6.0 mm ID×4.0 cm 1 piece manufactured by Tosoh Corporation
"TSK-GELMULTIPOREHXL-M" 7.8 mm ID×30.0 cm (16,000 of theoretical plates) 2 pieces manufactured by Tosoh Corporation
3 pieces in total (32,000 of theoretical plates as a whole)
Sample injection volume: 100 µl (sample solution concentration 1 mg/ml)
Liquid transfer pressure: 39 kg/cm$^2$
Detector: RI detector When the polymerizable organic compound component contains the monofunctional (meth) acrylamide-based monomer, the polyfunctional (meth) acrylic acid ester monomer, and the urethane (meth) acrylate oligomer, the content of the monofunctional (meth) acrylamide-based monomer is preferably 30 to 70% by mass, more preferably 40 to 60% by mass, and further preferably 45 to 65% by mass in 100% by mass of the polymerizable organic compound component.

When the polymerizable organic compound component contains the monofunctional (meth) acrylamide-based monomer, the polyfunctional (meth) acrylic acid ester monomer, and the urethane (meth) acrylate oligomer, the content of the polyfunctional (meth) acrylic acid ester monomer is preferably 20 to 60% by mass, more preferably 30 to 50% by mass, and further preferably 35 to 45% by mass in 100% by mass of the polymerizable organic compound component. Specifically, the content of the polyfunctional (meth) acrylic acid ester monomer is, for example, 20, 25, 30, 35, 40, 45, 50, 55, 60% by mass, and may be in the range between the two values exemplified herein.

When the polymerizable organic compound component contains the monofunctional (meth) acrylamide-based monomer, the polyfunctional (meth) acrylic acid ester monomer, and the urethane (meth) acrylate oligomer, the content of the urethane (meth) acrylate oligomer is preferably 0.1 to 30% by mass, more preferably 1 to 20% by mass, and further preferably 5 to 15% by mass in 100% by mass of the polymerizable organic compound component.

(Photopolymerization Initiator)

Examples of the photopolymerization initiator include benzophenone and its derivatives, benzyl and its derivatives, anthraquinone and its derivatives, benzoin, benzoin derivatives such as benzoin methyl ether, benzoin ethyl ether, benzoin propyl ether, benzoin isobutyl ether, benzyl dimethyl ketal, acetphenone derivatives such as diethoxyacetophenone and 4-t-butyltrichloroacetophenone, 2-dimethylaminoethylbenzoate, p-dimethylaminoethylbenzoate, diphenyldisulfide, thioxanthone and its derivatives, camphorquinone, camphorquinone derivatives such as 7,7-dimethyl-2,3-di oxobicyclo [2.2.1] heptane-1-carboxylic acid, 7,7-dimethyl-2,3-dioxobicyclo [2.2.1] heptane-1-carboxy-2-bromoethyl ester, 7, 7-dimethyl-2,3-dioxobicyclo [2.2.1] heptane-1-carboxy-2-methyl ester, 7,7-dimethyl-2,3-dioxobicyclo [2.2.1] heptane-1-carboxylic acid chloride, 2-methyl-1-[4-(methylthio) phenyl]-2-morpholinopropane-1-one, α-aminoalkylphenone derivatives such as 2-benzyl-2-dimethylamino-1-(4-mophorinophenyl)-butanone-1, acylphosphine oxide derivatives such as benzoyldiphenylphosphine oxide, 2,4,6-trimethylbenzoyldiphenylphosphine oxide, benzoyldiethoxyposhine oxide, 2,4,6-trimethylbenzoyl dimethoxyphenylphosphine oxide, 2,4,6-trimethylbenzoyl diethoxyphenylphosphine oxide, phenylbis (2,4,6-trimethylbenzoyl) phosphine oxide, oxyphenyl-acetic acid 2-[2-oxo-2-phenyl-acetoxy-ethoxy]-ethyl ester, and oxy-phenyl-acetic acid 2-[2-hydroxy-ethoxy]-ethyl ester and the like. Among these, acylphosphine oxide derivatives are preferable from the viewpoint of molding speed, and phenylbis (2,4,6-trimethylbenzoyl) phosphine oxide is particularly preferable.

The content of the photopolymerization initiator is preferably 0.5 to 10 parts by mass, and more preferably 1 to 7 parts by mass with respect to 100 parts by mass of the polymerizable organic compound component. Within such a range, a sufficient curing rate can be obtained and storage stability is also good.

(Other)

If desired, in addition to the above components, the photocurable composition for three-dimensional modeling according to one embodiment of the present invention may include a known substance such as a curing accelerator, a chain transfer agent, a thickener, a filler, a plasticizer, a coloring agent, a rust preventive, and the like, as long as the physical characteristics of the present invention are satisfied.

Examples of the curing accelerator include those containing a nitrogen atom. Among these, a tertiary amine having an alkyl group and the like are preferable, and specific examples thereof include dimethyl palmitylamine. The content of the curing accelerator is preferably 0.5 to 10 parts by mass, and more preferably 1 to 7 parts by mass with respect to 100 parts by mass of the polymerizable organic compound component.

Examples of the filler include an inorganic filler and an organic filler. Further, as the filler, a particulate one and a fibrous one can be used. When a particulate filler is used, the average particle size is not particularly limited and may be 0.001 to 50 μm. Further, two kinds of fillers having different average particle diameters, for example, a filler having an average particle diameter of 0.5 μm and a filler having an average particle diameter of 5 μm may be used in combination.

The average particle size is preferably obtained from the mass or volume particle size distribution curve obtained from a laser diffraction type particle size measuring device ("Model LS-230" type, manufactured by Coulter, Inc.).

Specific examples of the inorganic filler include aluminum oxide, aluminum hydroxide, silica soil, glass beads, hollow glass beads, magnesium oxide, magnesium hydroxide, magnesium carbonate, spherical silica, Shirasu balloons, glass fiber, potassium titanate whisker, carbon whisker, sapphire whisker, beryllia whisker, boron carbide whisker, silicon carbide whisker, silicon nitride whisker and the like.

Specific examples of the organic filler include polymers such as polyisobutene, polybutadiene, polyisoprene, styrene-butadiene copolymer, styrene-isoprene copolymer, (meth) acrylonitrile-butadiene copolymer, ethylene-α-olefin copolymer, ethylene-α-olefin-polyene copolymer, butyl rubber, styrene-butadiene block copolymer, styrene-isoprene block copolymer, hydride styrene-butadiene block copolymer, hydride butadiene polymer, hydride styrene-butadiene copolymer, chloroprene rubber, (meth) acrylic rubber, urethane rubber, (meth) acrylonitrile-butadiene-styrene copolymer, methyl (meth)acrylate-butadiene-styrene copolymer, polyester resin, polyethylene, polypropylene. Further, it is preferably dissolved in a raw material such as a (meth) acrylate.

2. Method for Producing a Three-Dimensional Modeled Object

The photocurable composition for three-dimensional modeling according to one embodiment of the present invention can be applied to various three-dimensional modeling methods for polymerizing by light irradiation and modeling. The photocurable composition for three-dimensional modeling of the present invention is preferably used in a surface exposure method, particularly in which light is irradiated from below.

The method for producing a three-dimensional modeled object according to an embodiment of the present invention includes a step of irradiating the photocurable composition for three-dimensional modeling with a light.

The method for producing the three-dimensional modeled object according to an embodiment of the present invention will be described in more detail with reference to FIG. 1. The method comprises a step of irradiating at least a part of the photocurable composition for three-dimensional modeling 3 between a modeling substrate 5 and a model film 7 to form a cured layer.

Preferably, irradiating is irradiating by a surface exposure method, in which the light is more preferably irradiated from below.

The irradiation time of the irradiation light is preferably 4 seconds or less, more preferably 2 to 4 seconds.

Preferably, the intensity of the irradiation light is 0.5 mW/cm$^2$ or more.

Preferably, the wavelength of the irradiation light (peak wavelength) is 365 to 405 nm.

Preferably, the method for producing further includes a step of moving the modeling substrate 5 or the modeling film 7 in the vertical direction.

Preferably, the distance to be moved in the vertical direction is 0.1 to 10 mm. The movement in the vertical direction is performed for peeling off the modeled object from the modeling film 7 and for moving to the light irradiation position of the next layer. In the movement for peeling, it may rise by the distance equal to or longer than the distance required for moving to the light irradiation position of the next layer and then return (descend) to the light irradiation position of the next layer to proceed to model.

Preferably, the time required for moving in the vertical direction is 0.5 to 1.5 seconds.

Preferably, the method for producing the three-dimensional modeled object further includes a step of filling with the photocurable composition for three-dimensional modeling 3.

Preferably, the time required for filling is 0.1 to 1 second.

Preferably, the step of taking out the modeled object from the modeling apparatus 1, cleaning the modeled object, and irradiating the modeled object with a light to further cure is included.

3. Application

Since the photocurable composition for three-dimensional modeling according to the present invention enables high-speed modeling, it can be used for various three-dimensional photomodeling applications, especially for producing a modeled object for testing. Such applications include, for example, the production of molding molds used for injection molding and blow molding. Since it is a resin, its durability is inferior to that of a metal mold, but the durability is not so problematic in the production of small lots and the production of temporary molds for testing. By using the photocurable composition for three-dimensional modeling according to the present invention, it is possible to produce such a mold at low cost and in a short time. That is, the photocurable composition for three-dimensional modeling of the present invention is, on one side, a photocurable composition for three-dimensional modeling for molding.

EXAMPLES

Hereinafter, the present invention will be described in more detail with reference to examples. Moreover, these are merely examples and do not limit the present invention.

Example 1

(Preparation of Photocurable Composition for Three-Dimensional Modeling)

The composition (S-1) was prepared by mixing 90 parts by mass of (A) Isobornyl acrylate (IBX-A: manufactured by Kyoeisha Chemical Co., Ltd., molecular weight: 208.30, acrylic equivalent: 208.30), 10 parts by mass of (B) tricyclodecanedimethanol diacrylate (A-DCP: manufactured by SHIN-NAKAMURA CHEMICAL Co., Ltd., molecular weight: 304.38, acrylic equivalent: 152.19), 4 parts by mass of (C) phenylbis (2,4,6-trimethylbenzoyl) phosphine oxide (I-819: manufactured by IGM Resins B.V., and 3 parts by mass of (D) dimethylpalmitylamine (DM6098: manufactured by Kao Corporation).

(Measurement of Each Physical Property)

<Steady Flow Viscosity>

For the composition (S-1) before photopolymerization, the steady flow viscosity was measured with a rotary rheometer (MCR302: manufactured by Antonio Paar) at 25° C. and a shear rate of 0.01 per second.

The results are shown in Table 1. When the steady flow viscosity at a shear rate of 0.01 per second was less than 5000 mPa·s and 1000 mPa·s or more, each of steady flow viscosity at 0.1 per second, 1 per second, and 10 per second was measured, and each measured value was plotted on a log-log graph with the vertical axis as the steady flow viscosity and the horizontal axis as the shear rate, and the extrapolation value at a shear rate of 0.01 per second was calculated by drawing an approximate straight line. When the steady flow viscosity at a shear rate of 0.01 per second was less than 1000 mPa·s and 100 mPa·s or more, each of steady flow viscosity at 1 per second, 10 per second, and 100 per second was measured, and each measured value was plotted on a log-log graph with the vertical axis as the steady flow viscosity and the horizontal axis as the shear rate, and the extrapolation value at a shear rate of 0.01 per second was calculated by drawing an approximate straight line. When the steady flow viscosity at a shear rate of 0.01 per second is less than 100 mPa·s and 10 mPa·s or more, each of steady flow viscosity at 10 per second, 100 per second, and 1000 per second was measured, and each measured value was plotted on a log-log graph with the vertical axis as the steady flow viscosity and the horizontal axis as the shear rate, and the extrapolation value at a shear rate of 0.01 per second was calculated by drawing an approximate straight line.

<Storage Shear Modulus and Loss Tangent>

Figure 2:
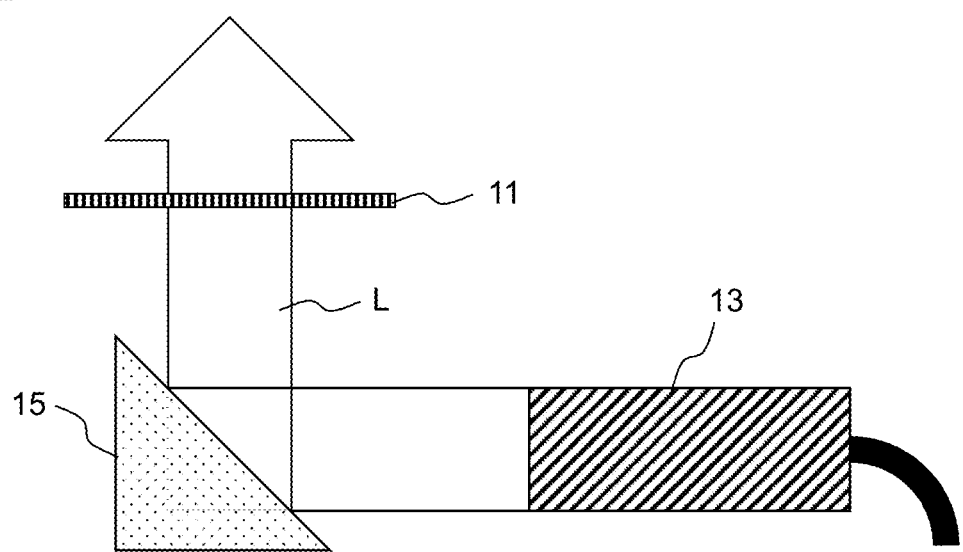
FIG. 2 is a schematic diagram of a light irradiation mechanism in a rotary rheometer capable of irradiating light.

The composition (S-1) is irradiated with light having a light irradiation intensity of 1.3 mW/cm$^2$ and a wavelength (peak wavelength) of 405 nm, and the composition at each integrated light irradiation time was measured with a rotary rheometer (MCR302: manufactured by Antonio Paar). As shown in FIG. 2, the sample on the glass perche plate 11 of the rotary rheometer was irradiated with light L emitted from a uniform surface irradiation lens 13 (HLL-Q2: manufactured by HOYA CORPORATION, light source H-4VH: manufactured by HOYA CORPORATION) via a 45° prism 15 to perform light irradiation. At this time, the measurement conditions were a pair of parallel plates with a diameter of 10 mm, a measurement gap of 0.1 mm, a frequency of 0.1 Hz, a strain of 0.5% or less, and 25° C. In addition, one measurement was 30 seconds and was performed twice continuously without an interval immediately after stopping light irradiation. As a result of repeating the light irradiation for 0.5 seconds and the measurement for 30 seconds per measurement twice, the storage shear modulus G' was 1×10$^6$ Pa (1 MPa) in the integrated light irradiation time of 4 seconds. Further, after the start of photopolymerization, the maximum value of the loss tangent tan δ on and after the gel point was 1.44.

These results are shown in Table 1.

(Evaluation)

Using the composition (S-1), a moldability evaluation model was actually modeled and its modeling performance was evaluated. Using a modeling apparatus (ML-48: manufactured by MUTOH INDUSTRIES LTD.), modeling was performed under the conditions of a laminated thickness of 100 μm, a vertical movement distance of 1 mm per layer of the stage, a vertical movement speed of 150 mm/min per layer of the stage, and a leveling time of 0.5 seconds set for leveling the composition after the stage moved up and down.

<Leveling Property>

The leveling property was evaluated by observing whether the composition was sufficiently leveled under the above-mentioned modeling conditions (leveling time set for leveling: 0.5 seconds). That is, under the above-mentioned modeling conditions, after the nth layer was formed and the nth layer was peeled off from the modeling film 7, it was observed whether the composition for forming the next layer flowed into the space between the nth layer and the modeling film 7 and the space was filled before light irradiation, that is, the composition was leveled. The evaluation criteria are as follows.

O: Leveling was sufficient

X: Leveling was not sufficient

<Modeling Discontinuity>

Figure 3:
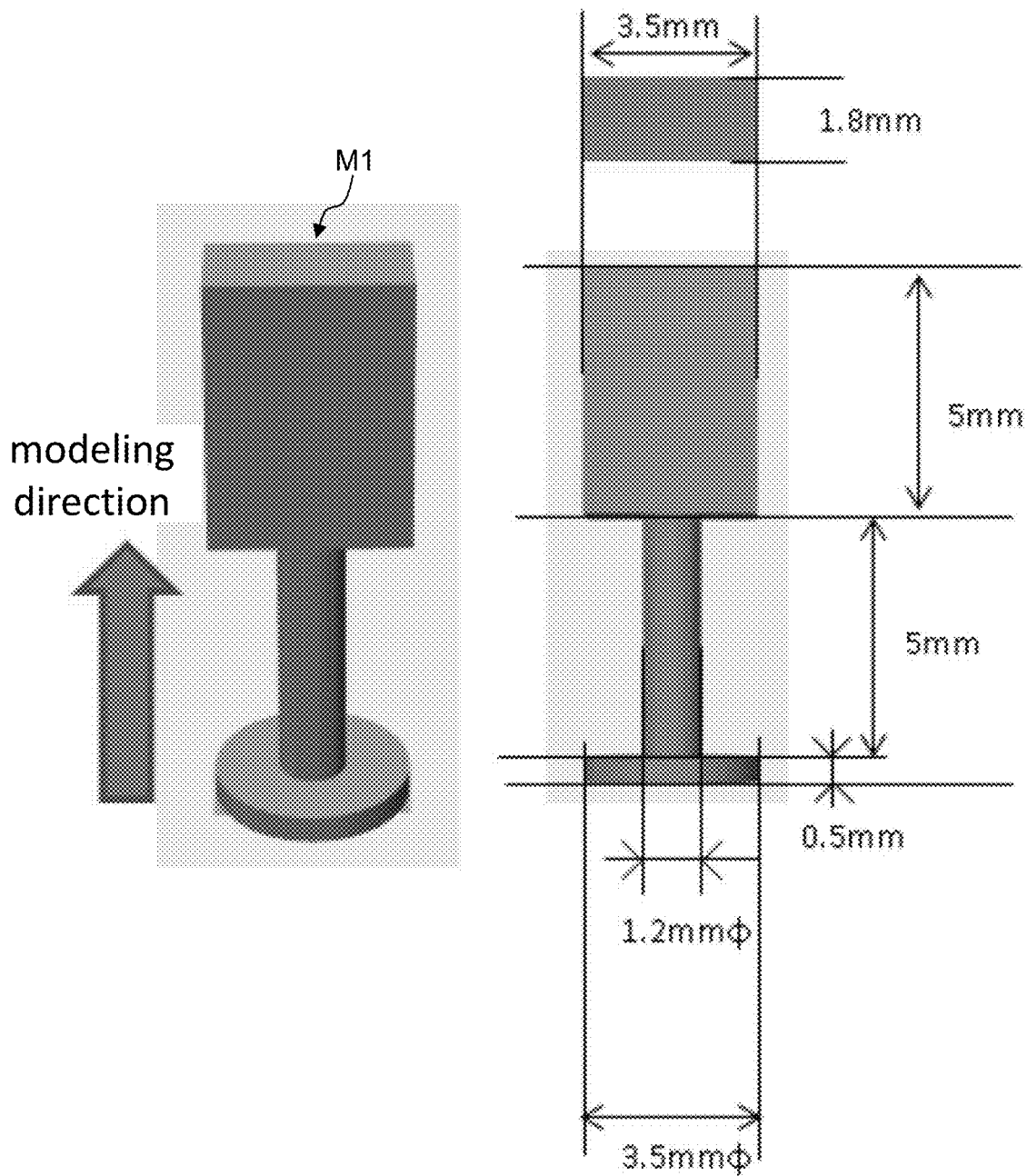
FIG. 3 is a diagram for explaining a shape and dimensions of moldability evaluation model M1.

The evaluation of the modeling discontinuity was performed by modeling the moldability evaluation model M1 shown in FIG. 3 under the above modeling conditions. Three moldability evaluation models M1 were modeled by light irradiation for each integrated time per layer in Table 1

(same as "integrated light irradiation time" in "physical properties"), and it was observed whether modeling could be completed.

Figure 4A:
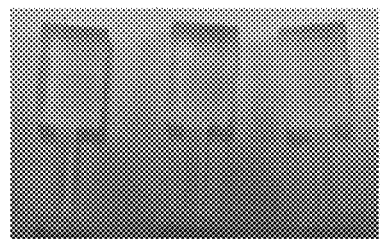
FIGS. 4A and 4B are diagrams showing an example of evaluation criteria of moldability evaluation model M1.
Figure 4B:
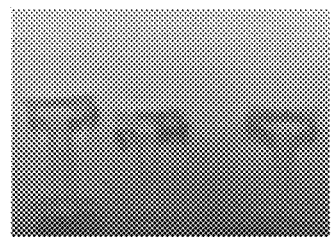

In the case where modeling could not be performed, even if light irradiation was performed for 4 seconds per layer, the four corners of the quadrangular cured layer were deformed after the transition from the cylindrical part with a diameter of 1.2 mm to the square pillar part of the moldability evaluation model M1, and modeling could not be continued. The evaluation criteria are as follows. An example of the modeled object in the case of "0" is shown in FIG. 4A, and an example of the modeled object in the case of "X" is shown in FIG. 4B.

O: In the modeling of all three models, there was no deformation that made modeling impossible during modeling, and modeling was completed.

X: Even when the integrated light irradiation time was 4 seconds, at least one model was deformed during modeling and the model could not be completed.

Figure 7:
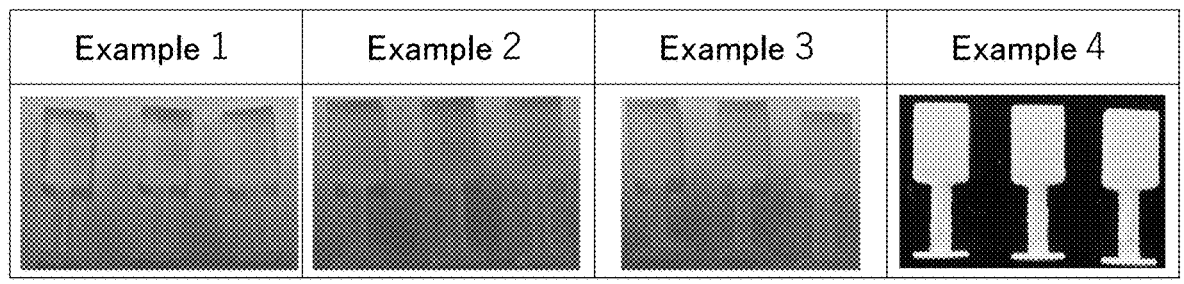
FIG. 7 is a diagram showing photographs of a modeled object of moldability evaluation model M1 in each Example and Comparative Example.
Figure 7:
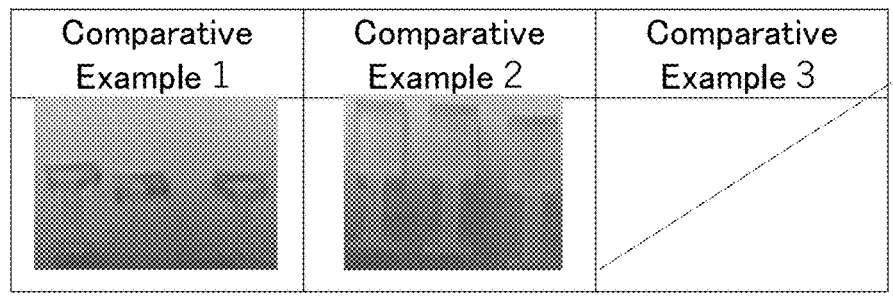
Figure 7:
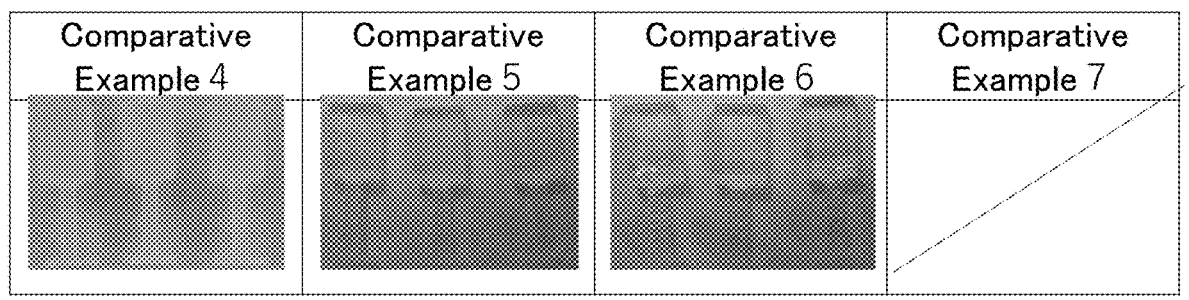

The moldability evaluation model M1 produced in each of the Examples is shown in FIG. 7. In Example 1 in which modeling was performed using the composition (S-1), three modeled objects with the shape as designed were obtained.

<Delamination Between Layers>

Figure 5:
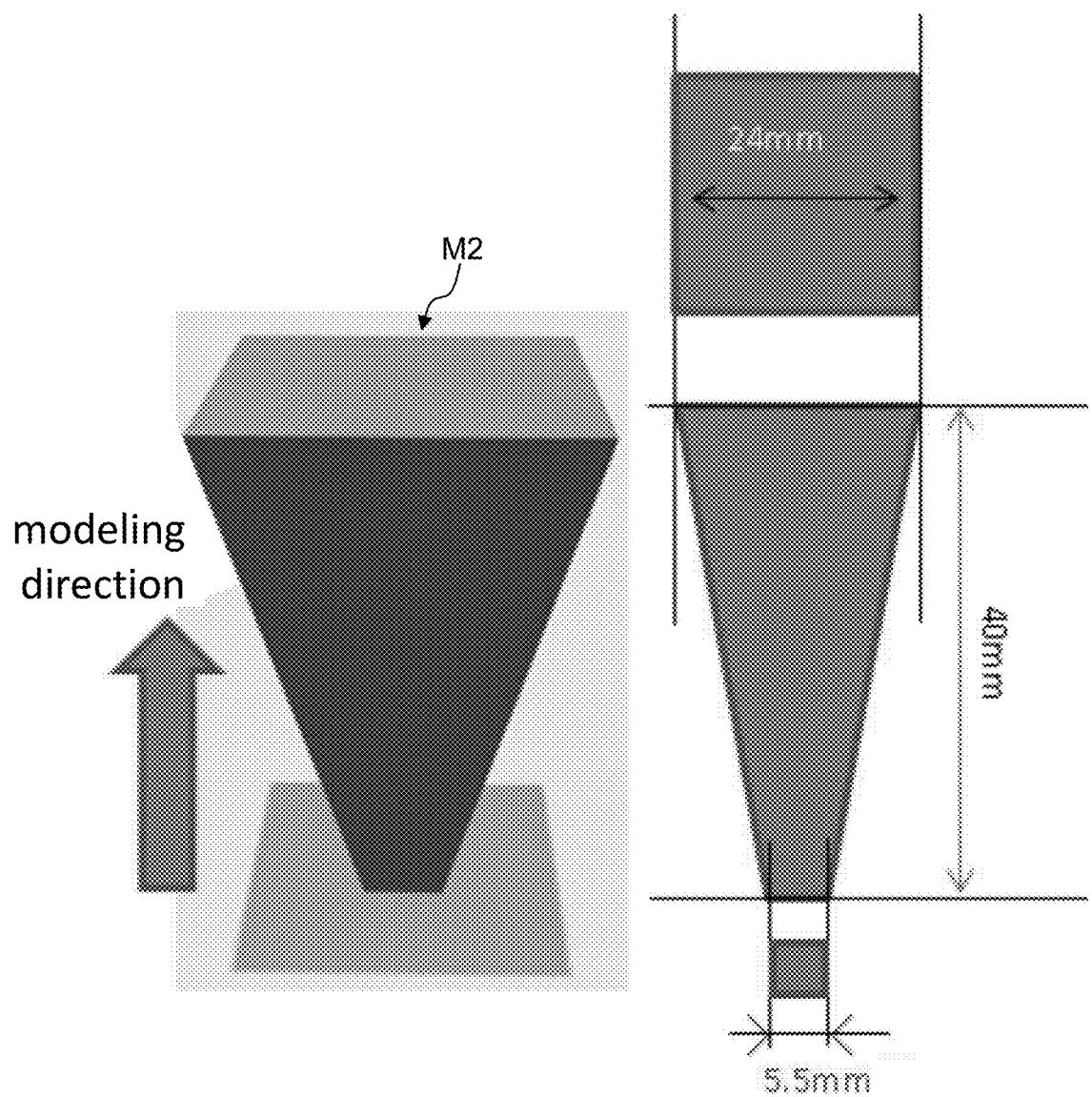
FIG. 5 is a diagram for explaining a shape and dimensions of moldability evaluation model M2.
Figure 6A:
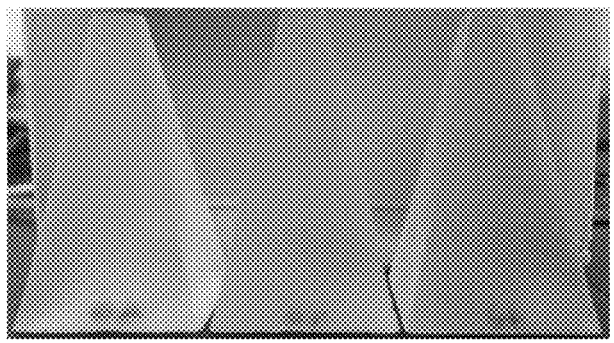
FIG. 6A and FIG. 6B are diagrams showing photographs of an example of evaluation criteria of moldability evaluation model M2.
Figure 6B:
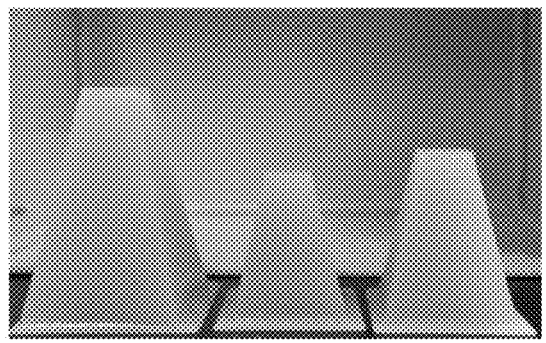

The evaluation of delamination was performed by modeling the moldability evaluation model M2 shown in FIG. 5 under the above modeling conditions. Three moldability evaluation models M2 were modeled by irradiating light for 4 seconds per layer, and it was observed whether the modeling could be performed without delamination. In the case where modeling could not be completed, even if light irradiation was performed for 4 seconds per layer, peeling occurred in any of the cured layers when the film was peeled off from the modeling film 7, and modeling could not be continued. The evaluation criteria are as follows. An example of the modeled object in the case of "0" is shown in FIG. 6A and an example of the modeled object in the case of "X" is shown in FIG. 6B.

O: In the modeling of all three models, delamination did not occur during modeling, and modeling was completed.

X: In the modeling of at least one model, delamination occurred during modeling and the model could not be completed.

Figure 8:
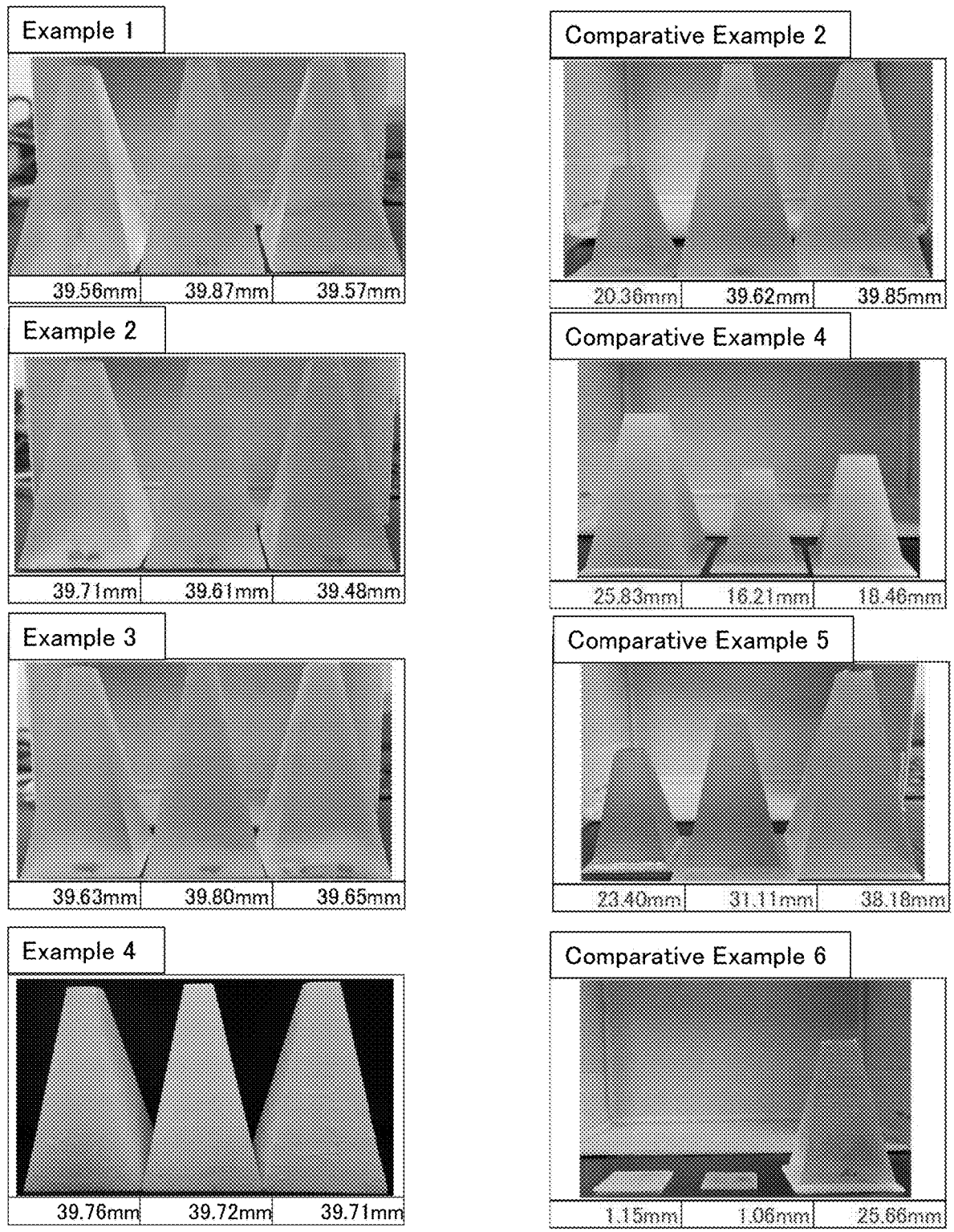
FIG. 8 is a diagram showing photographs of a modeled object of moldability evaluation model M2 in each Example and Comparative Example.

The moldability evaluation model M2 produced by each example is shown in FIG. 8. In Example 1 in which modeling was performed using the composition (S-1), three modeled objects with the shape as designed were obtained. The numerical value shown below each modeled object in FIG. 8 is the height of each modeled object obtained.

Examples 2 to 4 and Comparative Examples 1 to 3

The compositions (S-2) to (S-7) having the components shown in Table 1 were prepared, and the physical properties were measured, and modeled objects were modeled in the same manner as in Example 1 for evaluation. The contents of the components (A) to (E) are all described by "parts by mass".

Comparative Examples 4 to 7

Using the compositions (S-8) to (S-11) below, the physical properties was measured and a modeled object was modeled in the same manner as in Example 1 for evaluation.
S-8: Model Ortho (manufactured by NextDent B.V.)
S-9: Tlay (manufactured by NextDent B.V.)
S-10: SG (manufactured by NextDent B.V.)
S-11: Gingiva Mask (manufactured by NextDent B.V.)
The FB5D used in Example 4 and Comparative Example 3 was spherical silica having an average particle diameter of 5 μm (FB-5D, manufactured by Denka Company Limited), and the SFP30M was spherical silica having an average particle diameter of 0.5 μm (SFP-30M, manufactured by Denka Company Limited).

Example 5

To prepare a composition (S-12), 50 parts by mass of acryloylmorpholine (ACMO: manufactured by KJ Chemicals Corporation, molecular weight: 141.17, acrylic equivalent: 141.17), 40 parts by mass of tricyclodecanedimethanol diacrylate (A-DCP: manufactured by SHIN-NAKAMURA CHEMICAL Co., Ltd., molecular weight: 304.38, acrylic equivalent: 152.19), 10 parts by mass, of urethane acrylate (polyether-based bifunctional urethane acrylate having a weight average molecular weight of 6500. The polyol compound is polypropylene glycol. The organic polyisocyanate compound is isophorone diisocyanate. Hydroxy (meth) acrylate is 2-hydroxyethyl acrylate.), 4 parts by mass of phenylbis (2,4,6-trimethylbenzoyl) phosphine oxide (I-819: manufactured by IGM Resins B.V.), and 0.5 parts by mass of dimethyl palmityl. amine (DM6098: manufactured by Kao Corporation) was mixed. Using the obtained composition (S-12), the physical property was measured and a modeled object was modeled in the same manner as in Example 1 for evaluation.

<Bending Strength>

Using each of the compositions (S-1 and S-12), a test piece having a length of 10 mm, a width of 5 mm, and a thickness of 1 mm was modeled under the above-mentioned modeling conditions, and the bending strength was evaluated. The obtained test piece was evaluated using a viscoelasticity measuring device (RSA-G2: manufactured by TA Instruments) according to the test method described in JIS T 6501: 2012. The test was performed 10 times, and the average value of bending strength (MPa) was calculated. These results are shown in Table 2.

TABLE 1

|  |  |  | Example | | | | Comparative Example | | | | | | |
| --- | --- | --- | --- | --- | --- | --- | --- | --- | --- | --- | --- | --- | --- |
|  |  |  | 1 | 2 | 3 | 4 | 1 | 2 | 3 | 4 | 5 | 6 | 7 |
|  | sample No. |  | S-1 | S-2 | S-3 | S-4 | S-5 | S-6 | S-7 | S-8 | S-9 | S-10 | S-11 |
| component | (A) IBX-A |  | 90 | 60 | 50 | 80 | 95 | 40 | 80 |  |  |  |  |
|  | (B) A-DCP |  | 10 | 40 | 50 | 20 | 5 | 60 | 20 |  |  |  |  |
|  | (C) I-819 |  | 4 | 4 | 4 | 4 | 4 | 4 | 4 |  |  |  |  |
|  | (D) DM6098 |  | 3 | 3 | 3 | 3 | 3 | 3 | 3 |  |  |  |  |
|  | (E) spherical silica | FB5D | 0 | 0 | 0 | 96 |  |  | 111 |  |  |  |  |
|  |  | SFP30M | 0 | 0 | 0 | 64 | 0 | 0 | 74 |  |  |  |  |

TABLE 1-continued

|  |  | Example | | | | Comparative Example | | | | | | |
|---|---|---|---|---|---|---|---|---|---|---|---|---|
|  |  | 1 | 2 | 3 | 4 | 1 | 2 | 3 | 4 | 5 | 6 | 7 |
| physical property | steady flow viscosity (mPa·s) | 10.1 | 20.6 | 26.6 | 30000 | 9.0 | 25.3 | 40000 | 690 | 1130 | 1230 | 1670 |
|  | storage shear modulus G' (MPa) | 1 | 2 | 3 | 5 | 0.2 | 5 | 5 | 2 | 2 | 2 | 0.04 |
|  | integrated light irradiation time (second) | 4 | 2.5 | 2 | 2 | 4 | 2.5 | 2 | 4 | 4 | 4 | 4 |
|  | loss tangent tanδ | 1.44 | 0.53 | 0.50 | 0.61 | 2.27 | 0.45 | 0.61 | 0.32 | 0.36 | 0.36 | 0.25 |
| evaluation | leveling property | ○ | ○ | ○ | ○ | ○ | ○ | X | ○ | ○ | ○ | ○ |
|  | modeling discontinuity | ○ | ○ | ○ | ○ | X | ○ | X | ○ | ○ | ○ | X |
|  | delamination between layers | ○ | ○ | ○ | ○ | —[*1] | X | —[*2] | X | X | X | —[*1] |

[*1] It could not be evaluated. (It could not be peeled off from the modeling film. Even when it could peeled off, the modeled object was deformed and could not return.)
[*2] It could not be evaluated. (It could not be sufficiently leveled within the leveling time.)

TABLE 2

|  |  | Example | |
|---|---|---|---|
|  |  | 1 | 5 |
|  | sample No. | S-1 | S-12 |
| physical property | steady flow viscosity (mPa·s) | 10.1 | 65.9 |
|  | storage shear modulus G'(MPa) | 1 | 2 |
|  | integrated light irradiation time (second) | 4 | 2 |
|  | loss tangent tanδ | 1.44 | 0.681 |
|  | bending strength (MPa)[*1] | 50 | 107 |
| evaluation | leveling property | ○ | ○ |
|  | modeling discontinuity | ○ | ○ |
|  | delamination between layers | ○ | ○ |

[*1] average value of evaluation at n = 10

REFERENCE LIST

1: modeling apparatus 3: composition, 5: modeling substrate, 7: modeling film, 9: cured layer, 11: glass pelce plate, 13: uniform surface irradiation lens, 15: 45° prism, I: light, M1: moldability evaluation model M1, M2: moldability evaluation model m2, GP (P1): gel point (first intersection), P2: second intersection, P3: third intersection

The invention claimed is:

1. A photocurable composition for three-dimensional modeling, comprising a polymerizable organic compound component,
wherein:
the polymerizable organic compound component contains a urethane (meth) acrylate oligomer,
the photocurable composition has a steady flow viscosity of 30,000 mPa·s or less measured with a rotary rheometer at 25° C. and a shear rate of 0.01 per second,
when the photocurable composition for three-dimensional modeling is irradiated with a light having a light intensity of 1.3 mW/cm², G' becomes 1×10⁶ Pa or more after a start of photopolymerization in an integrated light irradiation time of 4 seconds or less,
after the start of photopolymerization, a maximum value of tan δ on and after a gel point is 0.5 or more,
the gel point is a point where G'=G" is satisfied for the first time after the start of photopolymerization,
G' is a storage shear modulus, G" is a loss shear modulus, and tan δ is a loss tangent, each of which is calculated based on measurement data for 30 seconds per one measurement, measured with a rotary rheometer having a pair of parallel plate with a diameter of 10 mm and a measurement gap of 0.1 mm at a strain of 0.5% or less, a frequency of 0.1 Hz, and 25° C.

2. The photocurable composition for three-dimensional modeling of claim 1, wherein the polymerizable organic compound component comprises:
at least one selected from a group of a monofunctional (meth) acrylic acid ester monomer and a monofunctional (meth) acrylamide-based monomer; and
a polyfunctional (meth) acrylic acid ester monomer.

3. The photocurable composition for three-dimensional modeling of claim 2, wherein a content of the polyfunctional (meth) acrylic acid ester monomer is 6 to 50% by mass in 100% by mass of the polymerizable organic compound component.

4. The photocurable composition for three-dimensional modeling of claim 2, wherein the monofunctional (meth) acrylic acid ester monomer contains a monofunctional (meth) acrylic acid ester monomer having a cyclic structure.

5. The photocurable composition for three-dimensional modeling of claim 2, wherein the polyfunctional (meth) acrylic acid ester monomer contains a polyfunctional (meth) acrylic acid ester monomer having a cyclic structure.

6. The photocurable composition for three-dimensional modeling of claim 4, wherein the cyclic structure is a polycyclic structure or an alicyclic hydrocarbon group.

7. The photocurable composition for three-dimensional modeling of claim 1, which contains a photopolymerization initiator.

8. A three-dimensional modeled object containing the photocurable composition for three-dimensional modeling of claim 1 or a cured product thereof.

9. A method for producing a three-dimensional modeled object, comprising a step of irradiating the photocurable composition for three-dimensional modeling of claim 1 with a light.

10. The method for producing a three-dimensional modeled object of claim 9, wherein the irradiating is irradiating by a surface exposure method.

11. The photocurable composition for three-dimensional modeling of claim 1, wherein the photocurable composition has the steady flow viscosity of 1,000 mPa·s or less measured with the rotary rheometer at 25° C. and the shear rate of 0.01 per second.

12. The photocurable composition for three-dimensional modeling of claim 1, wherein the photocurable composition has the steady flow viscosity of 100 mPa·s or less measured with the rotary rheometer at 25° C. and the shear rate of 0.01 per second.

13. The method for producing a three-dimensional modeled object claim 10, wherein the irradiating is irradiating by the surface exposure method in which the light is irradiated from below.

* * * * *